(12) United States Patent
Shinohara et al.

(10) Patent No.: US 7,751,474 B2
(45) Date of Patent: Jul. 6, 2010

(54) IMAGE ENCODING DEVICE AND IMAGE ENCODING METHOD

(75) Inventors: Junko Shinohara, Tokyo (JP); Yoshiko Hatano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1359 days.

(21) Appl. No.: 10/545,617

(22) PCT Filed: Nov. 27, 2003

(86) PCT No.: PCT/JP03/15182

§ 371 (c)(1),
(2), (4) Date: Aug. 16, 2005

(87) PCT Pub. No.: WO2005/004487

PCT Pub. Date: Jan. 13, 2005

(65) Prior Publication Data

US 2006/0245656 A1    Nov. 2, 2006

(30) Foreign Application Priority Data

Jun. 30, 2003    (JP)    ............................. 2003-186710

(51) Int. Cl.
*H04N 7/12*    (2006.01)
(52) U.S. Cl. .............. 375/240.01; 375/240; 375/240.12
(58) Field of Classification Search ................. 375/240, 375/240.01, 240.12
See application file for complete search history.

(56) References Cited

U.S. PATENT DOCUMENTS

| 6,381,275 B1 | 4/2002 | Fukuhara et al. |
| 6,430,222 B1 | 8/2002 | Okada |
| 6,639,942 B1 * | 10/2003 | Bayazit ................. 375/240.01 |
| 2002/0080876 A1 | 6/2002 | Oami |

FOREIGN PATENT DOCUMENTS

| JP | 6-54319 A | 2/1994 |
| JP | 10-23423 A | 1/1998 |
| JP | 2000-50254 A | 2/2000 |
| JP | 2000-78572 A | 3/2000 |
| JP | 2000-78588 A | 3/2000 |
| JP | 2000-92489 A | 3/2000 |
| JP | 2001-94980 A | 4/2001 |
| JP | 2001-510311 A | 7/2001 |
| JP | 2002-152732 A | 5/2002 |
| JP | 2002-262297 A | 9/2002 |
| WO | WO-99/03279 A1 | 1/1999 |

* cited by examiner

Primary Examiner—Allen Wong
(74) Attorney, Agent, or Firm—Birch, Stewart, Kolasch & Birch, LLP (57) ABSTRACT

An encoding controller (106) generates and outputs a current skip signal ($SK_i$) to a switch circuit (108), and outputs a quantization parameter (Qp) for controlling a code amount after the encoding processing of a current VOP by an encoder (103) using a current scene change signal ($SC_i$), to an encoder (106). The current scene change signal ($SC_i$) is set on the basis of the current VOP, a previous scene change signal ($SC_{i-1}$), and a previous skip signal ($SK_{i-1}$).

15 Claims, 5 Drawing Sheets

| WHEN CURRENT VOP IS SCENE CHANGE VOP | | | |
|---|---|---|---|
| | | PREVIOUS SKIP SIGNAL | |
| | | NOT SKIPPED 0 | SKIPPED 1 |
| PREVIOUS SCENE CHANGE SIGNAL | NO SCENE CHANGE 0 | 1 (S14) | 1 (S18) |
| | SINGLE ISOLATED SCENE CHANGE 1 | 2 (S15) | 1 (S18) |
| | CONTINUED SCENE CHANGE 2 | 2 (S15) | 2 (S17) |

FIG.5B

| WHEN CURRENT VOP IS NOT SCENE CHANGE VOP | | | |
|---|---|---|---|
| | | PREVIOUS SKIP SIGNAL | |
| | | NOT SKIPPED 0 | SKIPPED 1 |
| PREVIOUS SCENE CHANGE SIGNAL | NO SCENE CHANGE 0 | 0 (S20) | 0 (S21) |
| | ISOLATED SCENE CHANGE 1 | 0 (S20) | 1 (S21) |
| | CONTINUED SCENE CHANGE 2 | 2 (S20) | 2 (S21) |

FIG.6A

|  | VOP₁ | VOP₂ | VOP₃ | VOP₄ | VOP₅ |
|---|---|---|---|---|---|
| (1) CHANGE AMOUNT BETWEEN CURRENT VOP AND PREVIOUS VOP | SMALL | SMALL | LARGE | SMALL | SMALL |
| (2) CHANGE AMOUNT DETECTION INFORMATION | 0 | 0 | 1 | 0 | 0 |
| (3) SKIP SIGNAL | 0 | 0 | (1) | 0 | 0 |
| (4) SCENE CHANGE SIGNAL | 0 | 0 | 1 → | 1 | 0 |

FIG.6B

|  | VOP₁ | VOP₂ | VOP₃ | VOP₄ | VOP₅ |
|---|---|---|---|---|---|
| (1) CHANGE AMOUNT BETWEEN CURRENT VOP AND PREVIOUS VOP | SMALL | LARGE | LARGE | LARGE | SMALL |
| (2) CHANGE AMOUNT DETECTION INFORMATION | 0 | 1 | 1 | 1 | 0 |
| (3) SKIP SIGNAL | 0 | 0 | 0 | 0 | 0 |
| (4) SCENE CHANGE SIGNAL | 0 | 1 → | 2 | 2 | 0 |

IMAGE ENCODING DEVICE AND IMAGE ENCODING METHOD

TECHNICAL FIELD

The present invention relates to the encoding of a moving image, and more specifically to an image encoding apparatus and an image encoding method for performing the encoding using a technique represented by ITU-T Recommendation H.26x, ISO/IEC standard MPEG, and others. The image encoding apparatus and the image encoding method according to the present invention are used in a device mounted in a cellular phone, for instance.

BACKGROUND ART

MPEG-4 will be described below as an example. Generally, in an image encoding method represented by MPEG-4, input image signal data is compressed utilizing spatial and chronological correlations. The data obtained utilizing the spatial and chronological compression is variable-length encoded in a given sequence to generate a bit stream.

In MPEG-4, a whole display image (composite image) includes images (objects) of plural image series, so that an image plane of each image series at each display time is referred to as a video object plane (hereafter referred to as a "VOP") and is distinguished from a frame of MPEG-1 or MPEG-2. If a whole display image is formed from images of a single image series, the VOP agrees with the frame.

A VOP has a luminance signal and a color-difference signal, and is composed of a plurality of macroblocks. A macroblock includes a 16 by 16 matrix of pixels for the luminance signal. In the image encoding by MPEG-4, the amount of information is compressed by the spatial compression, chronological compression, and other schemes in a unit of each of macroblocks. The spatial compression is performed by converting the signals from the time domain to the frequency domain using a discrete cosine transform (hereafter referred to as a "DCT"), which is a type of orthogonal transformation, and then quantizing the converted signal. The chronological compression uses motion compensation.

Further, there are two methods of data compression in a unit of each of the VOPs: Spatial intra-picture coding (hereafter referred to as "intra-coding") encodes a VOP using only spatial compression in the same picture; and inter-picture coding (hereafter referred to as "inter-coding") encodes a VOP using chronological compression using the correlation of pictures.

An image encoding apparatus must output a bit stream of a designated code amount in accordance with a given encoding parameter. The image encoding apparatus must also control the amount of code generation in accordance with the estimated amount of occupation in a buffer (a virtual buffer verifier, hereafter referred to as a "VBV buffer") of the decoding apparatus for receiving a bit stream, so that the VBV buffer will not overflow nor underflow.

The amount of code generation is controlled in accordance with a quantization parameter, which is used to quantize a DCT coefficient set for each macroblock contained in a VOP. Therefore, the amount of code generation is controlled in a unit of each of the VOPs. Generally, as the quantization parameter increases, the amount of code generation decreases; and as the quantization parameter decreases, the amount of code generation increases. That is, the amount of code generation and the quantization parameter are in inverse proportion. Through the use of this property, the amount of code generation can be changed.

However, since the possible range of the quantization parameter is limited, it may be difficult to control the amount of code generation appropriately just in accordance with the quantization parameter, in some cases. So, if the amount of code generation is greater than a target value, not all the VOPs are subjected to the encoding processing, and a VOP which is not encoded is generated, that is, a skip VOP, the encoding processing of which is skipped, is generated, thereby suppressing the total amount of code generation. On the other hand, if the amount of code generation is smaller than the target value, processing is performed to insert a redundant bit into a bit stream, thereby increasing the amount of code generation. The above-mentioned technique for suppressing the amount of code generation by skipping part of the VOP encoding processing is described in document 1 (Japanese Patent Kokai (Laid-Open) Publication No. 2002-262297, pages 4 to 7 and FIG. 3), for instance.

Further, document 2 (Japanese Patent Kokai (Laid-Open) Publication No. H6-54319, pages 4 to 5 and FIG. 2) describes a code amount control method for detecting any scene change from an input signal and assigning a large code amount to an image immediately after the scene change so that image degradation at a scene change can be reduced in an apparatus for performing the encoding processing of an input image signal, for instance.

An image encoding apparatus for performing the encoding processing in accordance with the conventional MPEG-4 performs an encoding method for controlling the amount of code generation without performing the encoding processing for some VOPs, as described in document 1. Therefore, if a skip VOP, the encoding processing of which is skipped, is a VOP where a scene change is detected, the following problem arises.

Suppose that there are chronologically successive VOPs (respectively denoted as "$VOP_1$", "$VOP_2$", and "$VOP_3$" in chronological order) and that a scene change is detected in $VOP_2$, for instance. A greater code amount than usual must be assigned to $VOP_2$. Otherwise, the image quality will be degraded. However, if $VOP_2$ happens to be a skip VOP in order to suppress the total amount of code generation, the encoding processing of $VOP_2$ would not be performed. When the encoding processing of $VOP_3$ is performed, information indicating that $VOP_2$ has a scene change has been lost, and a normal code amount is assigned to the encoding processing of $VOP_3$. This could degrade the image quality of $VOP_3$.

Further, if the encoding method as described in document 2 is performed to avoid image degradation by detecting a scene change and assigning a greater code amount to an image immediately after the scene change, the following problem arises. When a scene change is detected in successive VOPs, a great code amount is assigned successively. This can degrade the image quality of a part other than the scene change or can cause a drop frame or the like. Therefore, an appropriate code amount cannot be assigned as a whole.

DISCLOSURE OF INVENTION

An object of the present invention is to provide an image encoding apparatus and an image encoding method which can control the VOP encoding processing in such a manner that the image quality will not be degraded even if a VOP where a scene change is detected becomes a skip VOP.

Further, another object of the present invention is to provide an image encoding apparatus and an image encoding method which can assign an appropriate code amount to each VOP even if a scene change is detected in successive VOPs.

The image encoding apparatus according to the present invention includes an encoder which performs encoding processing of input VOPs successively, thereby outputting a bit stream; a switch circuit which allows the encoding processing by the encoder to be skipped in a unit of each of the VOPs; an encoding controller which generates an i-th skip signal indicating whether or not the encoding processing of an i-th VOP is to be skipped and outputs the i-th skip signal to the switch circuit, where i is an integer not smaller than 1, the encoding controller generating a control signal for controlling a code amount after the encoding processing of the i-th VOP by the encoder using an i-th scene change signal of the i-th VOP and outputting the control signal to the encoder; and a scene change signal generator which generates the i-th scene change signal to be input to the encoding controller on the basis of information of the i-th VOP and a VOP input prior to the i-th VOP and an (i−1)-th skip signal indicating whether or not the encoding processing of the (i−1)-th VOP input a period of N VOPs before the i-th VOP is skipped, where N is an integer not smaller than 1.

BEST MODE FOR CARRYING OUT THE INVENTION

An image encoding apparatus in accordance with an embodiment of the present invention determines a current scene change signal for a current VOP, by not only referencing a signal indicating whether or not the amount of change in information (change in a characteristic amount such as luminance signal and color-difference signal) between the current VOP, the encoding processing of which is performed, and a previous VOP, which exists a period of N VOPs (N is an integer not smaller than 1) before the current VOP is greater than a predetermined value but also referencing a previous scene change signal indicating whether or not the previous VOP is a scene change VOP and a previous skip signal indicating whether or not the encoding processing of the previous VOP is performed. The image encoding apparatus sets a target code amount in accordance with the current scene change signal, and sets a quantization parameter required to set the target code amount.

The present embodiment will be described by taking an example where N is 1, but N is not limited to 1. In the following description, the current VOP may also be expressed as "$VOP_i$", where i is an integer not smaller than 1, and the previous VOP may also be expressed as "$VOP_{i-1}$". Further, the current skip signal may also be expressed as "$SK_i$", and the previous skip signal may also be expressed as "$SK_{i-1}$". In addition, the current scene change signal may also be expressed as "$SC_i$", and the previous scene change signal may also be expressed as "$SC_{i-1}$".

When N is 1, the image encoding apparatus appropriately performs the encoding processing of the current VOP by referencing not only information indicating whether or not the previous VOP is a scene change VOP but also the information indicating whether or not the encoding processing of the previous VOP is performed (that is, whether or not the encoding processing of the previous VOP is skipped), when determining the current scene change signal $SC_i$.

In the following description, if the amount of change in information between the previous VOP and the current VOP is greater than a predetermined value, it is said that the current VOP is a scene change VOP. If the amount of change in information between the previous VOP and the current VOP is not greater than the predetermined value, it is said that the current VOP is not a scene change VOP.

Further, if the amount of change in information between the previous VOP and the current VOP is greater than a predetermined value and if the amount of change in information between a VOP input N VOPs before the previous VOP (hereafter referred to as a "VOP preceding the previous VOP or twice previous VOP" or "$VOP_{i-2}$") and the previous VOP is not greater than a predetermined value, it is said that the current VOP is a single isolated scene change VOP. Furthermore, if the amount of change in information between the previous VOP and the current VOP is greater than a predetermined value and if the amount of change in information between the twice previous VOP and the previous VOP is greater than a predetermined value, it is said that the current VOP is a continued scene change VOP.

The image encoding apparatus in accordance with the embodiment of the present invention detects whether or not the current VOP is a scene change VOP and, if the current VOP is a scene change VOP, further detects whether or not the current VOP is a continued scene change VOP. On the bases of such detections, whether the current mode is a mode where the current VOP is detected as a single isolated scene change VOP or a mode where the current VOP is detected as a continued scene change VOP or a mode where the current VOP is not a scene change VOP can be detected. Then, the image encoding apparatus in accordance with the embodiment of the present invention sets a quantization parameter and a target code amount after the encoding of the current VOP, in accordance with the detected mode, and performs appropriate encoding processing of all of the successively input VOPs.

The image encoding apparatus and the image encoding method of the present invention will now be described in further detail with reference to drawings.

Figure 1:
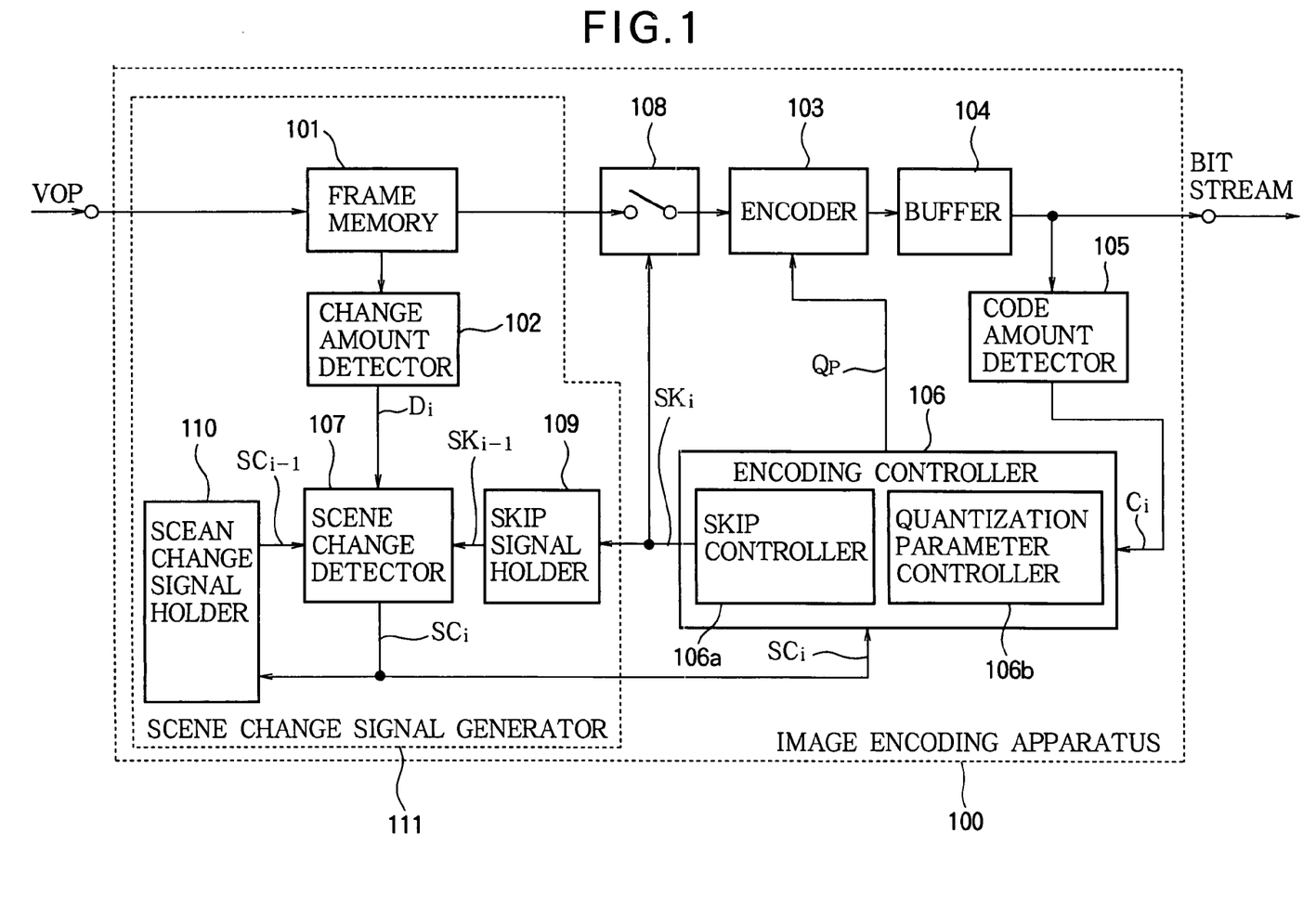
FIG. 1 is a block diagram schematically showing a configuration of an image encoding apparatus in accordance with an embodiment of the present invention.

FIG. 1 is a block diagram showing a configuration of an image encoding apparatus 100 in accordance with the embodiment of the present invention. As shown in FIG. 1, the image encoding apparatus 100 receives an image signal transmitted by wired communication or wireless communication, as a VOP. The image encoding apparatus 100 divides the input VOP into macroblocks, performs encoding processing, and outputs a bit stream.

As shown in FIG. 1, the image encoding apparatus 100 includes a frame memory 101 which stores an input VOP temporarily, a change amount detector 102 which detects the amount of change in information among the VOPs stored in the frame memory 101, a switch circuit 108, an encoder 103 which encodes the VOP input through the switch circuit 108 in a unit of each of macroblocks, a buffer 104 which temporarily stores a bit stream output from the encoder 103, a code amount detector 105 which counts the amount of code generation of each VOP from the bit stream stored in the buffer 104, and an encoding controller 106 determining a quantization parameter for the encoding performed by the encoder 103, for instance, on the basis of the scene change signal output from a scene change detector 107.

The image encoding apparatus 100 further includes the scene change detector 107 which generates a current scene change signal $SC_i$ in accordance with the amount of change in information among VOPs (amount of change in a characteristic amount, for instance) detected by the change amount detector 102, a previous skip signal $SK_{i-1}$ output from the skip signal holder 109, a previous scene change signal $SC_{i-1}$ output from the scene change signal holder 110, and the like; a scene change signal holder 110 which temporarily holds a scene change signal output from the scene change detector 107; and a skip signal holder 109 which temporarily holds a skip signal output from the encoding controller 106. The skip signal is a current skip signal $SK_i$ when it is input to the skip signal holder 109, and becomes a previous skip signal $SK_{i-1}$ when it is output to the scene change detector 107 (after a lapse of time from when it is input to the skip signal holder 109).

Further, the frame memory 101, the change amount detector 102, the scene change detector 107, the skip signal holder 109, and the scene change signal holder 110 constitute a scene change signal generator 111 for generating and outputting a current scene change signal $SC_i$.

Furthermore, the encoding controller 106 further includes a skip controller 106a which outputs a current skip signal $SK_i$, which indicates whether or not the encoding processing of the current VOP is skipped, and a quantization parameter controller 106b which sets a target code amount in the encoding processing of the current VOP and a quantization parameter.

Figure 2:
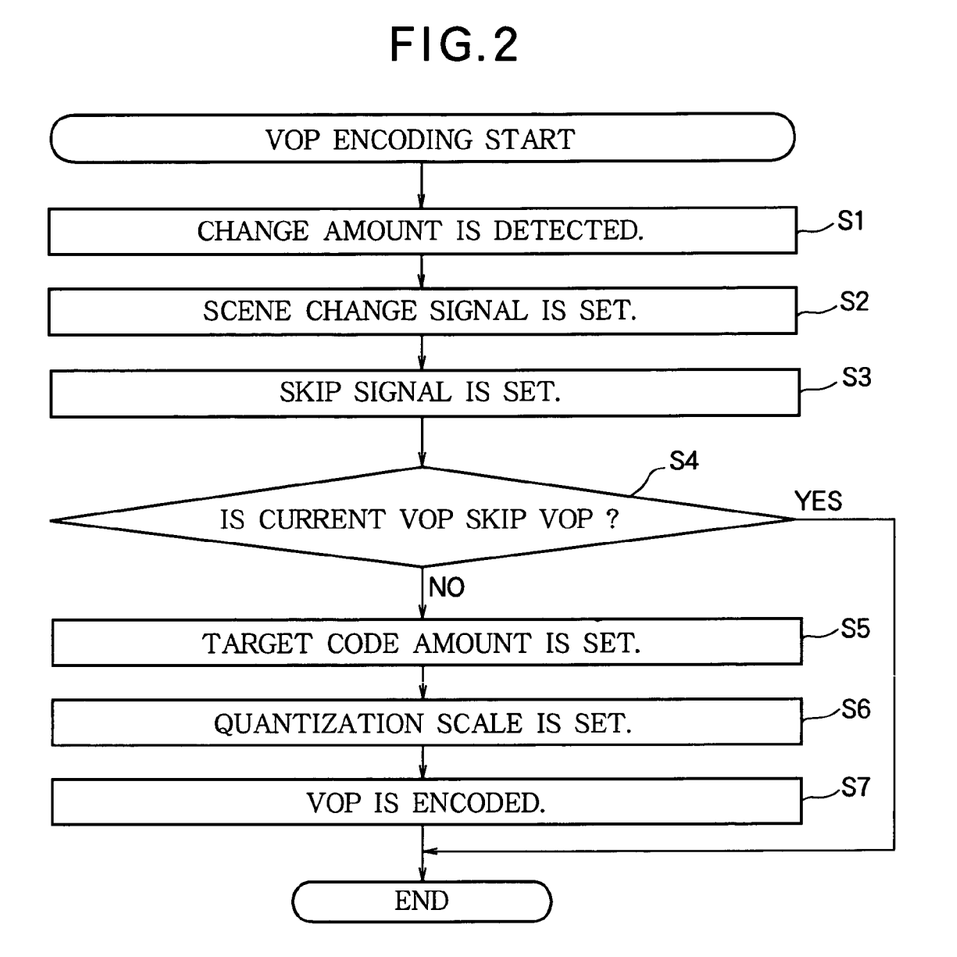
FIG. 2 is a flow chart showing the operation of encoding processing by the image encoding apparatus in accordance with the embodiment of the present invention.

FIG. 2 is a flow chart showing the operation of VOP encoding processing performed by the image encoding apparatus 100 in accordance with the embodiment of the present invention. With reference to FIG. 2, an overview of the VOP encoding processing will be described.

As shown in FIG. 2, the change amount detector 102 first detects the amount of change $D_i$ (for instance, amount of change in characteristic amounts such as luminance signal) between the current VOP and the previous VOP input to the image encoding apparatus 100 (step S1).

Next, the scene change detector 107 sets the current scene change signal $SC_i$ on the basis of the amount of change $D_i$ detected in step S1 and the previous scene change signal $SC_{i-1}$ (step S2). When the previous scene change signal $SC_{i-1}$ is judged, whether or not the encoding processing of the previous VOP has been skipped is considered. When the previous scene change signal $SC_{i-1}$ is judged, it is also considered whether the previous VOP is a single isolated scene change VOP or is a continued scene change VOP or is not a scene change VOP. Accordingly, whether or not the previous VOP is a continued scene change VOP can be detected from the previous scene change signal $SC_{i-1}$.

This embodiment uses three types of scene change signals, for instance: a signal when the current VOP is detected as not being a scene change VOP (signal value '0'), a signal when the current VOP is detected as being a single isolated scene change VOP (signal value '1'), and a signal when the current VOP is detected as being a continued scene change VOP (signal value '2').

It is judged whether or not the encoding processing of the current VOP is skipped (that is, whether or not the encoding processing of the current VOP is performed) on the basis of the code amount of the previous VOP and the size of the free space in the VBV buffer for receiving a bit stream output from the image encoding apparatus 100; and the current skip signal $SK_i$ for indicating whether or not the encoding processing of the current VOP is skipped is set (step S3). This embodiment uses two types of skip signals: a signal when it is judged that the encoding processing of the current VOP is performed (signal value '0') and a signal when it is judged that the encoding processing of the current VOP is not performed and the encoding processing is skipped (signal value '1').

If it is judged that the encoding processing of the current VOP is not performed (that is, the current VOP is a skip VOP) on the basis of the current skip signal $SK_i$ set in step S3 (that is, if the signal value of the current skip signal $SK_i$ is '1'), the image encoding apparatus 100 does not perform the encoding processing of the current VOP and terminates the processing of the current VOP judged as being a skip VOP (step S4). In step S4, if the current VOP is judged as being a VOP (that is, a VOP which is not a skip VOP), the encoding processing of which is performed, that is, if the signal value of the current skip signal $SK_i$ is '0', the processing of the image encoding apparatus 100 proceeds to next step S5.

The case where it is judged that the current VOP is a VOP, the encoding processing of which is performed, includes the following three cases, which will be described later: the case where the current VOP is a single isolated scene change VOP (that is, the case where the signal value of the current scene change signal $SC_i$ scene change VOP (that is, the case where the signal value of the current scene change signal $SC_i$ is '2'), or the case where the current VOP is not a scene change VOP (that is, the case where the signal value of the current scene change signal $SC_i$ is '0').

The encoding controller 106 sets a target code amount of the encoding processing (step S5) in such a way that the code amount after encoding processing when the current VOP is a single isolated scene change VOP (that is, when the signal value of the current scene change signal $SC_i$ is '1') becomes greater than the code amount after encoding processing when the current VOP is not a scene change VOP (that is, when the signal value of the current scene change signal $SC_i$ is '0') or when the current VOP is a continued scene change VOP (that is, when the signal value of the current scene change signal $SC_i$ is '2').

The encoding controller 106 sets a target code amount of the encoding processing (step S5) in such a way that the code amount after encoding processing when the current VOP is a continued scene change VOP (that is, when the signal value of the current scene change signal $SC_i$ is '2') does not become greater than the code amount after encoding processing when the current VOP is a single isolated scene change VOP (that is, when the signal value of the current scene change signal $SC_i$ is '1').

The quantization parameter Qp of each macroblock is determined (step S6) on the basis of the target code amount set in step S5, and the actual encoding processing of the current VOP is performed (step S7).

Figure 3:
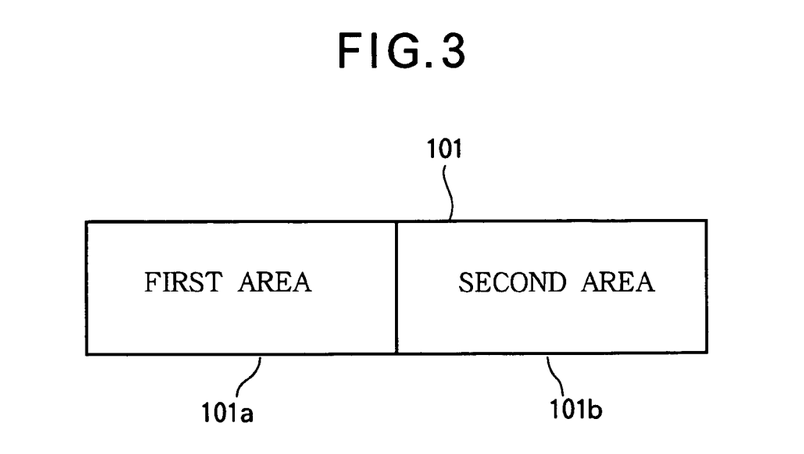
FIG. 3 is a diagram showing a configuration of a frame memory of the image encoding apparatus in accordance with the embodiment of the present invention.

The operation of the VOP encoding processing of the image encoding apparatus 100 will next be described in further detail, with reference to FIG. 1 to FIG. 3. FIG. 3 is a conceptual diagram showing a configuration of the frame memory 101 of the image encoding apparatus 100 in accordance with this embodiment.

First, a VOP input from a host control system (not shown) which exercises centralized control over the blocks of the image encoding apparatus 100 of this embodiment is stored in the frame memory 101 temporarily. The frame memory 101 includes two areas, as shown in FIG. 3: a first area 101a for storing the data of the (i−1)-th VOP, where i is a positive integer, and a second area 101b for storing the data of the i-th VOP. Accordingly, the data of two successive VOPs are held in the frame memory 101.

Next, the change amount detector 102 obtains the amount of change in information between two successive VOPs stored in the frame memory 101 (step S1) from the sum of the absolute values of differences among the pixels with regard to the luminance signal, for instance. The switch circuit 108 is turned on or off, on the basis of the skip signal $SK_i$ from the encoding controller 106, which will be described later. The VOP input through the switch circuit 108 to the encoder 103 is encoded in a unit of each of macroblocks by the encoder 103, in accordance with a quantization parameter Qp and a target code amount set by the encoding controller 106. The encoder 103 outputs a bit stream subjected to the encoding processing to the buffer 104. The bit stream output from the encoder 103 is stored in the buffer 104 temporarily and then output.

The bit stream stored in the buffer 104 is output in accordance with a control signal from the host control system described above. The output from the buffer 104 becomes the output of the image encoding apparatus 100. The bit stream stored in the buffer 104 is input to the code amount detector 105 as well.

The code amount detector 105 detects the magnitude of the code amount of the bit stream input from the buffer 104 to the code amount detector 105 (that is, the code amount after the encoding processing of the current VOP by the encoder 103) and outputs the result of detection to the encoding controller 106.

The scene change detector 107 sets the current scene change signal $SC_i$, on the basis of the amount of change in information between the current VOP and the previous VOP output from the change amount detector 102 (amount of change in a characteristic amount), the scene change signal of the previous VOP output from the scene change signal holder 110 (that is, the previous scene change signal $SC_{i-1}$), and the skip signal of the previous VOP output from the skip signal holder 109 (that is, the previous skip signal $SK_{i-1}$); and outputs the set current scene change signal $SC_i$ to the encoding controller 106 (step S2). The setting of the current scene change signal $SC_i$ will be described later in further detail.

The encoding controller 106 first determines whether or not the encoding processing of the current VOP is performed, and sets the current skip signal $SK_i$ in accordance with the determination (step S3). After the current skip signal $SK_i$ is set, the target code amount of the current VOP is set; the quantization parameter Qp is set in accordance with the target code amount; the current skip signal $SK_i$ is output to the switch circuit 108 and the skip signal holder 109; and the quantization parameter is output to the encoder 103. The switch circuit 108 is turned on or off in accordance with the current skip signal $SK_i$.

Whether or not the encoding processing of the current VOP is performed is determined by the skip controller 106a in the encoding controller 106, from the code amount of the bit stream corresponding to the previous VOP output from the code amount detector 105 and the size of the free space in the VBV buffer which is not shown. That is, whether or not the encoding processing of the current VOP is performed is determined depending on whether or not a problem occurs in the VBV buffer for receiving the bit stream if the code amount of the bit stream corresponding to the current VOP matches the code amount of the bit stream corresponding to the previous VOP after the encoding processing of the current VOP is performed. If the encoding processing of the previous VOP is skipped, the code amount of the bit stream corresponding to a VOP prior to the previous VOP (a VOP existing N VOPs before the previous VOP, expressed as a "twice previous VOP" or "$VOP_{i-2}$", for instance) is referenced. The code amount to be referenced when the encoding processing of the previous VOP is skipped may also be a predetermined fixed value.

In step S4, if it is judged that the encoding processing of the current VOP is not performed and the encoding processing is skipped, the skip controller 106a sets the signal value of the current skip signal $SK_i$ to '1'. When the signal value of the current skip signal $SK_i$ is '1', the switch circuit 108 is turned off, and the signal value '1' of the current skip signal $SK_i$ is input to the skip signal holder 109. On the other hand, if it is judged that the encoding processing of the current VOP is performed, the skip controller 106a sets the signal value of the current skip signal $SK_i$ to '0' in order to indicate that the encoding processing of the current VOP is performed, and the signal value '0' of the current skip signal $SK_i$ is input to the skip signal holder 109.

In step S5, when the signal value of the current skip signal $SK_i$ is '0', the quantization parameter controller 106b in the encoding controller 106 sets a target encoding value for encoding, on the basis of the current scene change signal $SC_i$ input from the scene change detector 107. The scene change signal has three modes as described later: a mode in which the current VOP is detected as not being a scene change VOP, a mode in which the current VOP is detected as being a single isolated scene change VOP, and a mode in which the current VOP is detected as being a continued scene change VOP.

When the current VOP is detected as being a continued scene change VOP, if the target encoding value set in a similar manner to the case where the current VOP is detected as being a continued scene change VOP, a great code amount is assigned to successive VOPs, which can degrade the image quality of a portion other than the scene change portion. Therefore, the encoding controller 106 sets the target code amount when the current VOP is detected as being a continued scene change VOP to a level lower than the target code amount when the current VOP is detected as being a single isolated scene change VOP; and the quantization parameter controller 106b sets a quantization parameter Qp of the encoding processing on the basis of the set target code amount (step S6). The encoding controller 106 turns on the switch circuit 108, outputs a quantization parameter Qp to the encoder 103, and inputs the signal value '0' of the current skip signal $SK_i$ to the skip signal holder 109.

If it is detected that the current VOP is a single isolated scene change VOP, the quantization parameter controller 106b sets a greater target code amount than when the current VOP is detected as being a continued scene change VOP or when the current VOP is detected as not being a scene change VOP, and quantization parameter Qp of the encoding processing is set on the basis of the set target code amount (step S6). The encoding controller 106 then turns on the switch circuit 108, outputs a quantization parameter Qp to the encoder 103, and inputs the signal value '0' of the current skip signal $SK_i$ to the skip signal holder 109. Therefore, an image display apparatus using the image encoding apparatus 100 of the embodiment can display an image with a stable quality even at a scene change.

If it is detected that the current VOP is not a scene change VOP, the quantization parameter controller 106b sets a smaller target code amount than when the current VOP is detected as being a single isolated scene change VOP, and sets quantization parameter Qp of the encoding processing on the basis of the set target code amount (step S6). The switch circuit 108 is then turned on, quantization parameter Qp is output to the encoder 103, and the signal value '0' of the current skip signal $SK_i$ is input to the skip signal holder 109.

A target encoding value is set for each mode, and a quantization parameter Qp is set accordingly, in the encoding processing of the current VOP, so that the code amount of the encoding processing performed by the encoder 103 can be controlled to an appropriate level as a whole.

Figure 4:
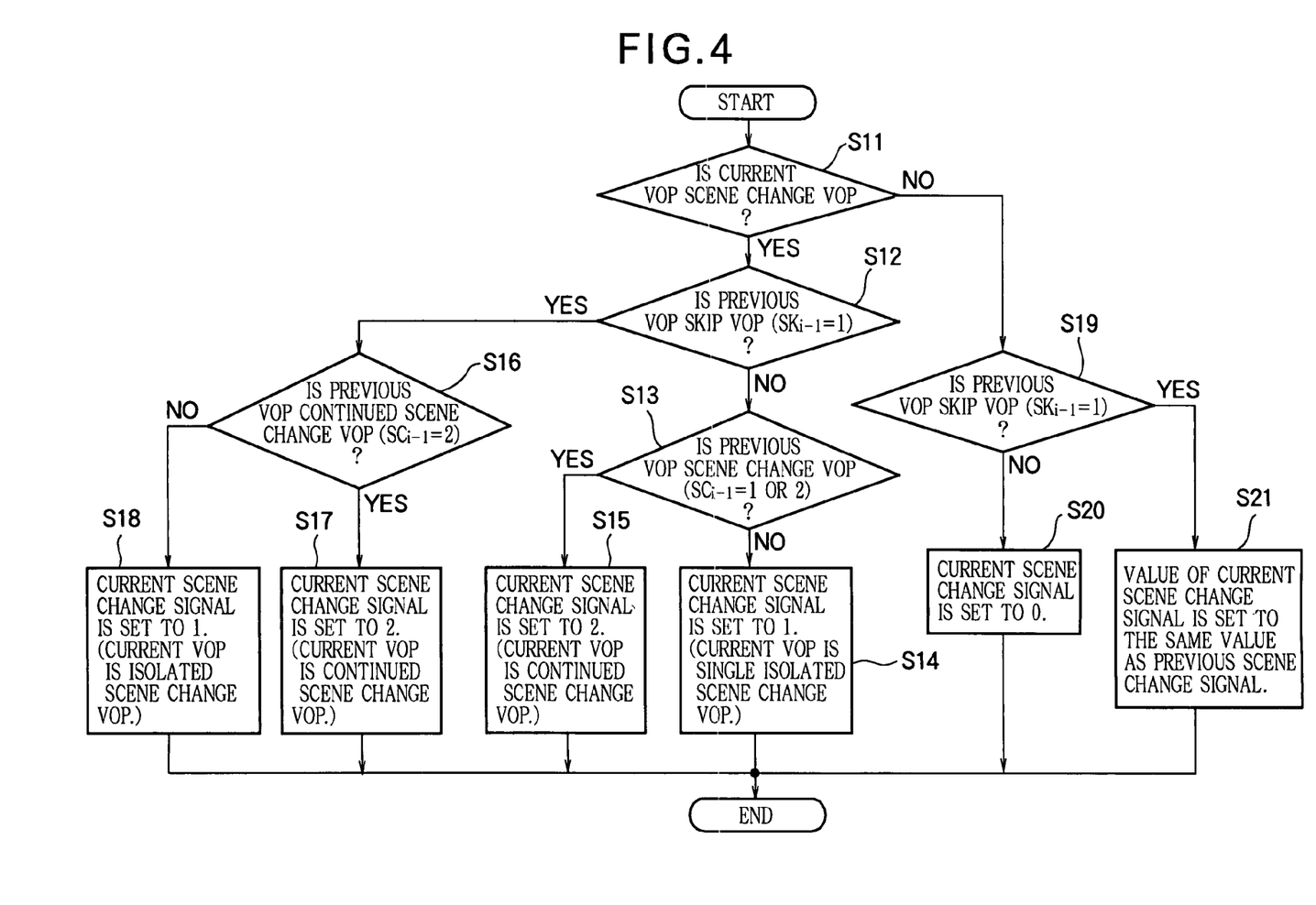
FIG. 4 is a flow chart showing the processing of setting a scene change signal by the scene change detector of the image encoding apparatus in accordance with the embodiment of the present invention.
Figure 5A:
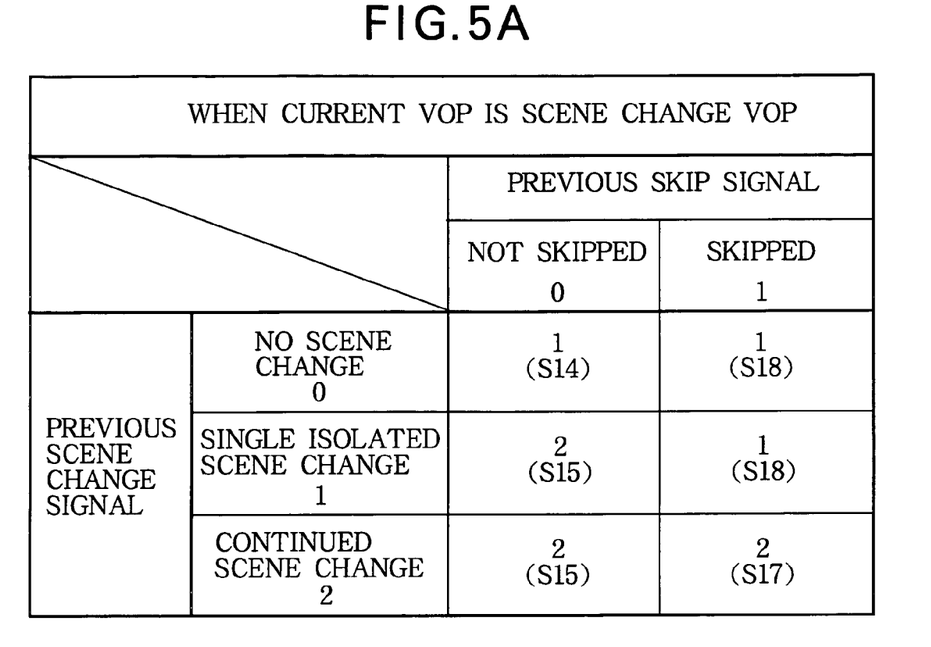
FIGS. 5A and 5B are diagrams showing a relationship between a scene change signal and a skip signal in the image encoding apparatus in accordance with the embodiment of the present invention.
Figure 5B:
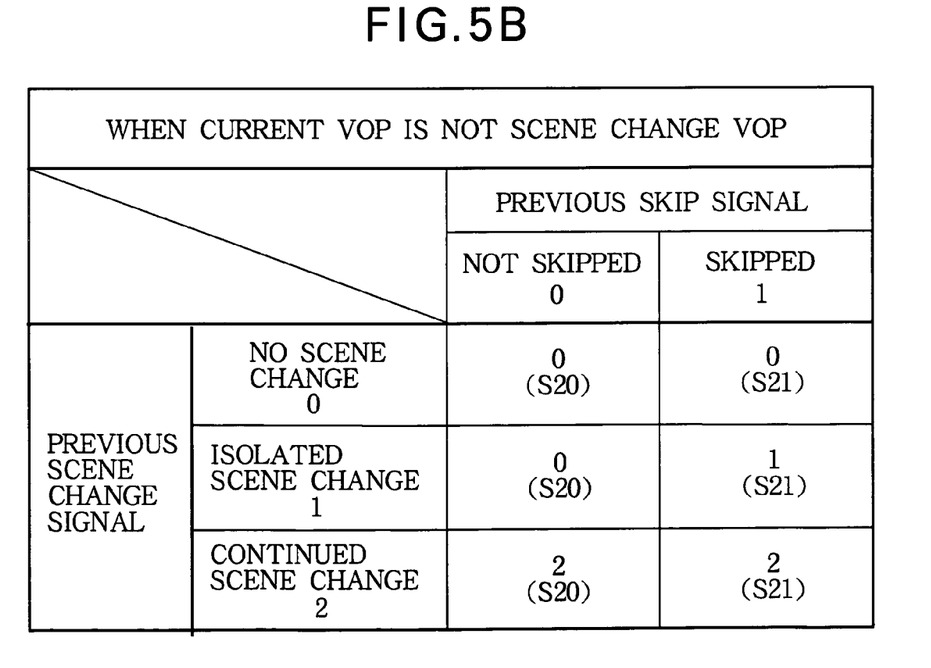

FIG. 4 is a flow chart showing the processing of setting the current scene change signal $SC_i$ by the image encoding apparatus 100. Further, FIGS. 5A and 5B are diagrams showing the current scene change signal $SC_i$ corresponding to the previous skip signal $SK_{i-1}$ and the previous scene change signal $SC_{i-1}$ in the image encoding apparatus 100.

The method of setting a scene change signal by the scene change detector 107 of the image encoding apparatus 100 will now be described with reference to FIG. 4 and FIGS. 5A and 5B. FIG. 5A shows the processing of steps S12 to S18 in FIG. 4, and FIG. 5B shows the processing of steps S19 to S21 in FIG. 4.

The scene change detector 107 detects whether or not the current VOP is a scene change VOP. If the current VOP is a scene change VOP, the scene change detector 107 detects whether the current VOP is a continued scene change VOP or a single isolated scene change VOP.

As shown in FIG. 4, in step S11, the scene change detector 107 judges whether or not the amount of change in information between successive VOPs, that is, the amount of change $D_i$ in information between the current VOP and the previous VOP, is greater than a predetermined amount of change in information. If it is judged in step S11 that the amount of change $D_i$ is greater than the predetermined value, the current VOP is judged as being a scene change VOP, and the processing of the scene change detector 107 proceeds to step S12. If it is judged in step S11 that the amount of change $D_i$ is not greater than the predetermined value, the current VOP is judged as not being a scene change VOP, and the processing of the scene change detector 107 proceeds to step S19. As has been described earlier, the scene change detector 107 receives the amount of change detected by the change amount detector 102. The detected amount of change is, for instance, the sum of absolute values of differences among the pixels of successive VOPs with regard to the luminance signal.

When the processing proceeds to step S12, it is judged whether or not the previous VOP is a skip VOP, the encoding processing of which is not performed, on the basis of the previous skip signal $SK_{i-1}$. If the previous VOP is judged as being a skip VOP (that is, if the signal value of the previous skip signal $SK_{i-1}$ is '1'), the processing proceeds to step S16. If it is judged in step S12 that the previous VOP is not a skip VOP (that is, if the signal value of the previous skip signal $SK_{i-1}$ is '0'), the processing proceeds to step S13. If the previous VOP is a skip VOP, a relationship between the twice previous VOP, which exists N VOPs prior to the previous VOP, and the current VOP is needed. To detect the state of the twice previous VOP, the relationship with the VOP existing N VOPs prior to the twice previous VOP (hereafter expressed as a "VOP preceding VOP preceding the previous VOP or three times previous VOP" or "$VOP_{i-3}$") is needed.

In step S12, if the signal value of the previous skip signal $SK_{i-1}$ is not '0' but '1', the previous VOP is a skip VOP, so that the processing of the scene change detector 107 proceeds to step S16.

In step S16, it is detected whether or not the signal value of the previous scene change signal $SC_{i-1}$ is '2'. That is, it is detected whether the previous VOP is a continued scene change VOP or the previous VOP is the other VOPs (the latter is a case where the signal value of the previous scene change signal $SC_{i-1}$ is '0' or '1'). Because it is detected in step S12 that the previous VOP is a skip VOP, the relationship with the states of the previous VOP, the twice previous VOP, and the three times previous VOP is needed to judge the state of the current VOP.

If the signal value of the previous scene change signal $SC_{i-1}$ is '2', that is, if the previous VOP is a continued scene change VOP, in step S16:

(1a) The amount of change in information between the three times previous VOP and the twice previous VOP is greater than a predetermined value;

(1b) The amount of change in information between the twice previous VOP and the previous VOP, the encoding processing of which is skipped, is greater than a predetermined value;

(1c) The amount of change in information between the previous VOP, the encoding processing of which is skipped, and the current VOP is greater than a predetermined value.

Accordingly, if just the VOP, the encoding processing of which is performed, is considered, (2a) The amount of change in information between the three times previous VOP and the twice previous VOP is greater than the predetermined value; and (2b) The amount of change in information between the twice previous VOP and the current VOP is greater than a predetermined value.

So, the current VOP is considered to be a continued scene change VOP, and the signal value of the current scene change signal $SC_i$ is set to '2' (step S17).

If the signal value of the previous scene change signal $SC_{i-1}$ is '1', that is, if the previous VOP is a single isolated scene change VOP, in step S16, (3a) The amount of change in information between the three times previous VOP and the twice previous VOP is not greater than a predetermined value;

(3b) The amount of change in information between the twice previous VOP and the previous VOP, the encoding processing of which is skipped, is greater than a predetermined value; and (3c) The amount of change in information between the previous VOP, the encoding processing of which is skipped, and the current VOP is greater than a predetermined value.

Accordingly, if just the VOPs, the encoding processing of which is performed, are considered, (4a) The amount of change in information between the three times previous VOP and the twice previous VOP is not greater than a predetermined value; and (4b) The amount of change in information between the twice previous VOP and the current VOP is greater than a predetermined value.

Therefore, the current VOP is judged to be a single isolated scene change VOP, and the signal value of the current scene change signal $SC_i$ is set to '1' (step S18).

If the signal value of the previous scene change signal $SC_{i-1}$ is '0', that is, if the previous VOP is neither a single isolated scene change VOP nor a continued scene change VOP, in step S16, (5a) The amount of change in information between the three times previous VOP and the twice previous VOP is not greater than a predetermined value;

(5b) The amount of change in information between the twice previous VOP and the previous VOP, the encoding processing of which is skipped, is not greater than a predetermined value; and (5c) The amount of change in information between the previous VOP, the encoding processing of which is skipped, and the current VOP is greater than a predetermined value.

Accordingly, if just the VOPs, the encoding processing of which is performed, are considered, (6a) The amount of change in information between the three times previous VOP and the twice previous VOP is not greater than a predetermined value; and (6b) The amount of change in information between the twice previous VOP and the current VOP is greater than a predetermined value.

Therefore, the current VOP is treated as a single isolated scene change VOP, and the signal value of the current scene change signal $SC_i$ is set to '1' (step S18).

The current scene change signal $SC_i$ has a mode detected as being a continued scene change as well as a mode detected as being a single isolated scene change and a mode detected as not being a scene change, as described above, and the target code amount and the quantization parameter in the mode detected as being a continued scene change are set so that the code amount of the bit stream becomes smaller than the one in the mode detected as being a single isolated scene change, and the encoding processing is performed. In this case, an appropriate code amount can be assigned to each VOP even if there are successive scene change VOPs, and appropriate encoding processing can be consequently performed as a whole.

The code amount of the bit stream generated by the encoding processing of the VOP is controlled by referencing the skip signal and the scene change signal of the previous VOP and detecting a scene change of the current VOP even if the skip VOP is a scene change VOP, so that detected information is appropriately used and a stable image quality can be obtained.

A case in which the previous VOP is judged as being a VOP, the encoding processing of which is performed, in step S12 will next be described. In this case, the processing of the image encoding apparatus 100 proceeds from step S12 to step S13. In step S13, it is judged whether the previous scene change signal $SC_{i-1}$ is '1' or '2' (that is, whether the previous VOP is a scene change) or '0' (that is, whether the previous VOP is not a scene change). It is judged in step S11 that the amount of change in information between the previous VOP and the current VOP is greater than a predetermined value, and the encoding processing of the previous VOP is performed, so that just the relationship between the twice previous VOP and the previous VOP must be checked in step S13.

If the signal value of the previous scene change signal $SC_{i-1}$ is '0', that is, if the previous VOP is neither a single isolated scene change VOP nor a continued scene change VOP in step S13:

(7a) The amount of change in information between the twice previous VOP and the previous VOP is not greater than a predetermined value; and (7b) The amount of change in information between the previous VOP and the current VOP is greater than a predetermined value.

Accordingly, the current VOP is judged as being a single isolated scene change VOP, and the signal value of the current scene change signal $SC_i$ is set to '1' (step S14).

On the other hand, if the signal value of the previous scene change signal $SC_{i-1}$ is '1', that is, if the previous VOP is a single isolated scene change VOP, in step S13:

(8a) The amount of change in information between the twice previous VOP and the previous VOP is greater than a predetermined value; and (8b) The amount of change in information between the previous VOP and the current VOP is greater than a predetermined value.

Accordingly, the current VOP is judged as being a continued scene change VOP, and the signal value of the current scene change signal $SC_i$ is set to '2' (step S15).

If the signal value of the previous scene change signal $SC_{i-1}$ is '2', that is, if the previous VOP is a continued scene change VOP, in step S13:

(9 a) The amount of change in information between the twice previous VOP and the previous VOP is greater than a predetermined value; and (9b) The amount of change in information between the previous VOP and the current VOP is greater than a predetermined value.

Accordingly, the current VOP is judged as being a continued scene change VOP, and the signal value of the current scene change signal $SC_i$ is set to '2' (step S15).

If the current scene change signal $SC_i$ has a mode detected as being a continued scene change as well as a mode detected as being a single isolated scene change and a mode detected as not being a scene change, as described above, the target code amount and the quantization parameter are judged so that the code amount of the bit stream in the mode detected as being a continued scene change becomes smaller than that in the mode detected as being a single isolated scene change, and the encoding processing is performed. An appropriate code amount can be assigned to each VOP even if there are successive scene changes, and appropriate encoding processing can be consequently performed as a whole.

An example in which the amount of change in information between successive VOPs is not greater than a predetermined value will next be described. The following description corresponds to the processing of steps S11 to S19 in FIG. 4 and relates to FIG. 5B.

In this case, it is judged first whether or not the previous VOP is a skip VOP (step S19). This is because, if the previous VOP is a skip VOP, the information of the previous VOP must be held.

In step S19, if the signal value of the previous skip signal $SK_{i-1}$ is '0', that is, if the previous VOP is a VOP, the encoding processing of which is performed, the processing proceeds to step S20. It is detected in step S11 that:

(10a) The amount of change in information between the previous VOP and the current VOP is not greater than a predetermined value. Therefore, the relationship between the previous VOP and the current VOP does not change even if the amount of change in information between the twice previous VOP and the previous VOP is greater than a predetermined value or is not greater than the predetermined value. In this case, it is judged that the current VOP is neither a single isolated scene change VOP nor a continued scene change VOP, and the signal value of the current scene change signal $SC_i$ is set to '0' (step S20).

On the other hand, if the signal value of the previous skip signal $SK_{i-1}$ is '1' in step S19, that is, if the previous VOP is a skip VOP, the relationship between the twice previous VOP and the previous VOP is needed.

If the signal value of the previous scene change signal $SC_{i-1}$ is '0', that is, if the previous VOP is neither a single isolated scene change VOP nor a continued scene change VOP, the amount of change in information between the twice previous VOP and the previous VOP, the encoding processing of which is skipped, is not greater than a predetermined value. Accordingly:

(11a) The amount of change in information between the twice previous VOP and the previous VOP, the encoding processing of which is skipped, is not greater than a predetermined value; and (11b) The amount of change in information between the previous VOP, the encoding processing of which is skipped, and the current VOP is not greater than a predetermined value.

Therefore, the current VOP is judged as neither being a single isolated scene change VOP nor being a continued scene change VOP, and the signal value of the current scene change signal $SC_i$ is set to '0' (step S21).

If the signal value of the previous scene change signal $SC_{i-1}$ is '1' in step S19, that is, if the previous VOP is a single isolated scene change VOP:

(12a) The amount of change in information between the twice previous VOP and the previous VOP, the encoding processing of which is skipped, is greater than a predetermined value; and (12b) The amount of change in information between the previous VOP, the encoding processing of which is skipped, and the current VOP is not greater than a predetermined value.

Therefore:

(13a) The amount of change in information between the twice previous VOP and the current VOP is greater than a predetermined value. So, the current VOP is judged as being a single isolated scene change VOP, and the signal value of the current scene change signal $SC_i$ is set to '1' (step S21).

If the signal value of the previous scene change signal $SC_{i-1}$ is '2' in step S19, that is, if the previous VOP is a continued scene change VOP:

(14a) The amount of change in information between the three times previous VOP and the twice previous VOP is greater than a predetermined value;

(14b) The amount of change in information between the twice previous VOP and the previous VOP, the encoding processing of which is skipped, is greater than a predetermined value; and (14c) The amount of change in information between the previous VOP, the encoding processing of which is skipped, and the current VOP is not greater than a predetermined value.

Accordingly:

(15a) The amount of change in information between the three times previous VOP and the twice previous VOP is greater than a predetermined value; and (15b) The amount of change in information between the twice previous VOP and the current VOP is greater than a predetermined value. Therefore, the current VOP is judged as being a continued scene change VOP, and the signal value of the current scene change signal $SC_i$ is set to '2' (step S21).

That is, in any case, the signal value of the previous scene change signal $SC_{i-1}$ is held, and the signal value of the current scene change signal is set to the same signal value as the previous scene change signal $SC_{i-1}$.

If a skip VOP is a scene change VOP, the skip signal and the scene change signal of the previous VOP are referenced to detect a scene change, so that detected information can be appropriately used, code amount control can be performed as expected, and a stable image quality can be obtained, as has been described above.

Figure 6A:
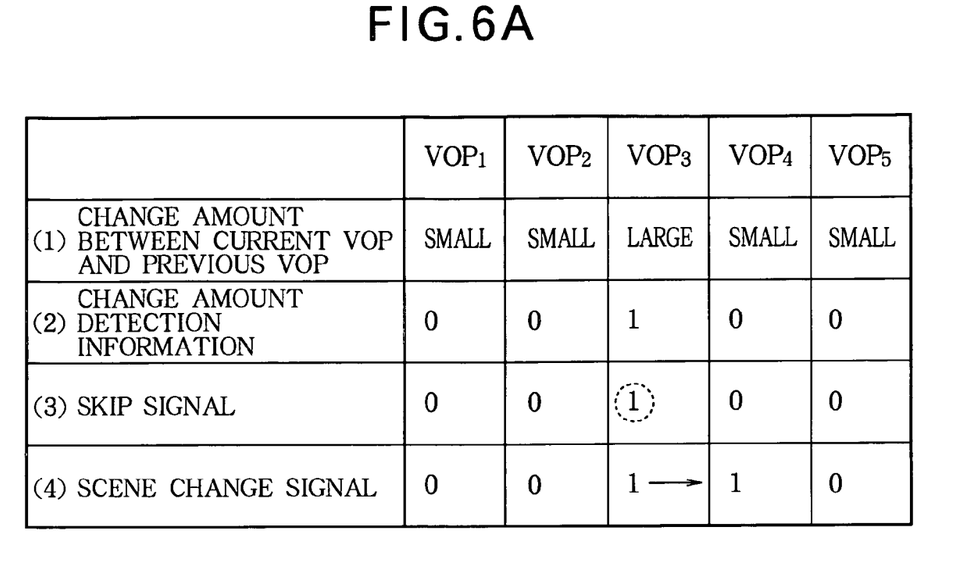
FIGS. 6A and 6B are diagrams showing a relationship among the amount of change between VOPs, change amount detection information, a skip signal, and a scene change signal in the image encoding apparatus in accordance with the embodiment of the present invention.
Figure 6B:
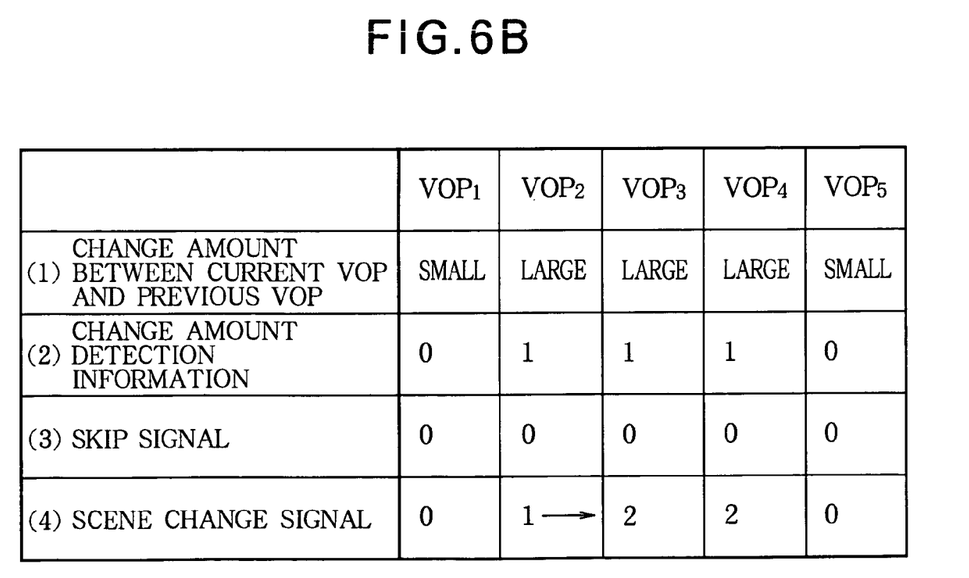

FIGS. 6A and 6B are diagrams for describing the relationship among the amount of change between the current VOP and the previous VOP, the skip signal, and the scene change signal in the image encoding apparatus 100. To be more specific, FIGS. 6A and 6B show the following items (1) to (4):

The item (1) shows whether the amount of change between the current VOP and the previous VOP is greater or is not greater than a predetermined value for judging whether or not there is a scene change, with regard to each VOP of from $VOP_1$ to $VOP_5$.

The item (2) shows the change amount detection information indicating the actual scene change information based on the amount of change between the current VOP and the previous VOP.

The item (3) shows the skip signal indicating whether or not the encoding processing of each VOP is performed.

The item (4) shows the set value of the current scene change signal $SC_i$ of each VOP, based on the change amount detection information based on the amount of change between the current VOP and the previous VOP, the previous skip signal $SK_{i-1}$, and the previous scene change signal $SC_{i-1}$.

FIG. 6A shows an example in which a single isolated scene change VOP is a skip VOP. In FIG. 6A, the amount of change in information between $VOP_2$ and the preceding $VOP_1$ is not greater than a predetermined value. In this case, the change amount detection information is set to '0', which indicates that the amount of change is not greater than a predetermined value. Accordingly, the scene change signal of $VOP_2$ is set to '0', which indicates that $VOP_2$ is not a scene change VOP. On the other hand, if $VOP_2$ is judged as being a VOP, the encoding processing of which is performed, as a result of code amount control, the signal value of the skip signal of $VOP_2$ is set to '0', which indicates that the VOP is not a skip VOP.

Next, if the amount of change in information between $VOP_2$ and $VOP_3$ is greater than a predetermined value, $VOP_3$ is detected as being a scene change VOP and the signal value of the change amount detection information is set to '1'. Suppose that $VOP_3$ is judged as being a skip VOP, the encoding processing of which is not performed, as a result of code amount control (a part surrounded by a circle depicted by a broken line in FIG. 6A). In accordance with the setting method described in the flow chart of FIG. 4, the amount of change in information between $VOP_3$ and $VOP_2$ is greater than a predetermined value (step S11); $VOP_2$ is a VOP, the encoding processing of which is performed (step S12); and $VOP_2$ is not a scene change VOP (step S13); so that the signal value of the scene change signal of $VOP_3$ is set to '1' (step S14).

In addition, if the amount of change in information between $VOP_4$ and $VOP_3$ is not greater than a predetermined value, no scene change is detected, and the signal value of the change amount detection information is set to '0'. If $VOP_4$ is judged as being a VOP, the encoding processing of which is performed, as a result of code amount control, the signal value of the skip signal is set to '0'. In this case, in accordance with the setting method described in the flow chart of FIG. 4, the amount of change in information between $VOP_4$ and $VOP_3$ is smaller than a predetermined value (step S11); $VOP_3$ is a VOP, the encoding processing of which is performed (step S19); and the signal value of the scene change signal of $VOP_3$ is '1'; so that the signal value of the scene change signal of $VOP_4$ is set to '1' (step S21).

In a case as shown in FIG. 6A, even if the change amount detection information causes the encoding processing of $VOP_3$ where a scene change is detected to be skipped, the scene change detection information can be applied to perform the encoding processing by referencing the scene change signal and the skip signal of $VOP_3$ for setting the scene change signal of the next $VOP_4$ even when a skip VOP, the encoding processing of which is not performed, and a single isolated scene change VOP occur concurrently.

Next, FIG. 6B shows an example in which a scene change is detected in successive VOPs. In FIG. 6B, the amount of change between $VOP_2$ and the preceding $VOP_1$ is greater than a predetermined value. In this case, the change amount detection information is set to '1', which indicates that the amount is greater than the predetermined value. Because the amount of change in information between $VOP_2$ and $VOP_1$ is greater than a predetermined value (step S11), $VOP_1$ is a VOP, the encoding processing of which is performed (step S12), and $VOP_1$ is not a scene change VOP (step S13), the scene change signal of $VOP_2$ is set to '1', which indicates that a scene change is detected (step S14). If $VOP_2$ is judged as being a VOP, the encoding processing of which is performed, as a result of code amount control, the signal value of the skip signal of $VOP_2$ becomes '0'. The skip signals of all the subsequent VOPs are set to '0'.

Because the amount of change in information between $VOP_3$ and $VOP_2$ is greater than a predetermined value, a scene change is detected, and the signal value of the change amount detection information is set to '1'. In accordance with the setting method described in the flow chart of FIG. 4, the amount of change in information between $VOP_3$ and $VOP_2$ is greater than a predetermined value (step S11); $VOP_2$ is a VOP, the encoding processing of which is performed (step S12); and $VOP_2$ is a single isolated scene change VOP (step S13); so that the signal value of the scene change signal of $VOP_3$ is set to '2', which indicates that the VOP is a continued scene change VOP (step S15).

In addition, because the amount of change in information between $VOP_4$ and $VOP_3$ is greater than a predetermined value, a scene change is detected, and the signal value of change amount detection information is set to '1'. In accordance with the setting method described in the flow chart of FIG. 4, the amount of change in information between $VOP_4$ and $VOP_3$ is greater than a predetermined value (step S11); $VOP_3$ is a VOP, the encoding processing of which is performed (step S12); and $VOP_3$ is a continued scene change VOP (step S13); so that the signal value of the scene change signal of $VOP_4$ is set to '2', which indicates that the VOP is a continued scene change VOP (step S15).

When successive scene changes occur as in from $VOP_2$ to $VOP_4$ described above, appropriate code amount control can be performed by setting the signal value of the scene change signal of just $VOP_2$ to '1' and providing a mode for detecting the scene change signals of $VOP_3$ and $VOP_4$ including successive scene changes as not being a single isolated scene change but as being a continued scene change.

A scene change detected in a single isolated VOP is differentiated from a scene change detected in successive VOPs, the code amount assigned to the latter is set to a smaller value than the code amount assigned to the former, so that an excessive code amount will not be assigned to the successive scene changes. Accordingly, degradation in image quality of a part other than the scene change and a drop frame can be avoided, and a stable image quality can be obtained as a whole.

The amount of change between the current VOP and the previous VOP is detected in the embodiment described above, but the amount of change between the current VOP and a VOP subsequent to the current VOP and the amount of change between the previous VOP and the current VOP may be detected, and a scene change may be detected from these two amounts of change. In addition, the current VOP may reference a plurality of VOPs.

The change amount detector 102 of the embodiment described above detects a scene change by obtaining the amount of change in information between successive VOPs taken in the frame memory 101, as the sum of the absolute values of differences among pixels with regard to the luminance signal, and comparing the amount of change with a predetermined value, but a chrominance signal may be used instead of the luminance signal.

In addition, the amount of change in information between successive VOPs is obtained as the sum of the absolute values of differences among pixels, but a characteristic value of the picture such as the maximum value, minimum value, or central value of the signal value in the picture can be used instead.

Further, the amount of change in information between successive VOPs is calculated across the entire picture plane, but the picture plane can also be divided into some small areas, and calculation and comparison can be made in the divided small areas.

A scene change may be detected by using a set of several scene change detection methods described above. For instance, a set of the scene change detection methods are used, and a scene change may be detected when the condition of the scene change is satisfied in at least one method of the set of several scene change detection methods. The present invention further includes the other methods based on the set of the scene change detection methods described above, such as a method of detecting a scene change from the results of the detection methods based on majority rule, a method of detecting a scene change based on majority rule, with a weight assigned to the set of the detection methods, a method of detecting a scene change when the condition of the scene change is satisfied by a predetermined number of detection methods or more, and a method of detecting a scene change when the condition of the scene change is satisfied by a specific method.

The image encoding apparatus according to the present invention performs the encoding processing in accordance with the quantization parameter set by the encoding controller, so that the encoding processing can be performed by making use of the scene change detection information even if a VOP, the encoding processing of which is not performed, is a VOP where a scene change is detected.

Further, when a scene change is detected in successive VOPs, appropriate encoding processing can be performed as a whole by assigning an appropriate value as the code amount.

The invention claimed is:

1. An image encoding apparatus comprising:
   an encoder which performs encoding processing of input Video Object Planes (VOPs) successively, thereby outputting a bit stream;
   a switch circuit which allows the encoding processing by the encoder to be skipped in a unit of each of the VOPs;
   an encoding controller which generates an i-th skip signal indicating whether or not the encoding processing of an i-th Video Object Plane (VOP) is to be skipped and outputs the i-th skip signal to the switch circuit, where i is an integer not smaller than 1, the encoding controller generating a control signal for controlling a code amount after the encoding processing of the i-th VOP by the encoder using an i-th scene change signal of the i-th VOP and outputting the control signal to the encoder; and a scene change signal generator which generates the i-th scene change signal to be input to the encoding controller on the basis of information of the i-th VOP and a VOP input prior to the i-th VOP and an (i–1)-th skip signal indicating whether or not the encoding processing of the (i–1)-th VOP input a period of N VOPs before the i-th VOP is skipped, where N is an integer not smaller than 1.

2. The image encoding apparatus according to claim 1, further comprising:

a code amount detector which outputs a code amount signal indicating a code amount after the encoding processing of the (i–1)-th VOP by the encoder to the encoding controller;

the encoding controller generating the i-th skip signal on the basis of the code amount signal.

3. The image encoding apparatus according to claim 2, wherein the encoding controller generates the control signal to be input to the encoder on the basis of the i-th scene change signal, the code amount signal, and the i-th skip signal.

4. The image encoding apparatus according to claim 1, wherein the scene change signal generator includes:

a change amount detector which detects an amount of change in information between the (i–1)-th VOP and the i-th VOP;

a skip signal holder which stores the (i–1)-th skip signal;

a VOP information holder which stores information based on a VOP input prior to the i-th VOP; and a scene change detector which generates the i-th scene change signal to be input to the encoding controller;

the scene change detector generating the i-th scene change signal on the basis of the amount of change, the (i–1)-th skip signal, and the information of a VOP input prior to the i-th VOP.

5. The image encoding apparatus according to claim 4, wherein:

the information of a VOP input prior to the i-th VOP is an (i–1)-th scene change signal of the (i–1)-th VOP; and the VOP information holder is a scene change signal holder.

6. The image encoding apparatus according to claim 5, wherein if an amount of change in information between the (i–1)-th VOP and the i-th VOP is greater than a predetermined value, the i-th VOP is treated as a scene change VOP; and if the i-th VOP is not the scene change VOP and if the encoding processing of the (i–1)-th VOP is skipped, the scene change detector equalizes the i-th scene change signal with the (i–1)-th scene change signal.

7. The image encoding apparatus according to claim 6, wherein:

if an amount of change in information between an (i–1)-th VOP and an i-th VOP is not greater than a predetermined value, an i-th VOP is not treated as a scene change VOP;

if an amount of change in information between an (i–1)-th VOP and an i-th VOP is greater than a predetermined value, an i-th VOP is treated as a scene change VOP;

if the i-th VOP is a scene change VOP, if the encoding processing of the (i–1)-th VOP is not skipped and if the (i–1)-th VOP is not a scene change VOP, the scene change detector generates an i-th scene change signal indicating that the i-th VOP is a single isolated scene change VOP; and if the i-th VOP is a scene change VOP, if the encoding processing of the (i–1)-th VOP is not skipped and if the (i–1)-th VOP is a scene change VOP, the scene change detector generates an i-th scene change signal indicating that the i-th VOP is a continued scene change VOP.

8. The image encoding apparatus according to claim 4, wherein:

if an amount of change in information between the (i–1)-th VOP and the i-th VOP is greater than a predetermined value and if an amount of change in information between an (i–2)-th VOP and the (i–1)-th VOP is not greater than a predetermined value, the i-th VOP is treated as a single isolated scene change VOP;

if an amount of change in information between the (i–1)-th VOP and the i-th VOP is greater than a predetermined value and if an amount of change in information between an (i–2)-th VOP and the (i–1)-th VOP is greater than a predetermined value, the i-th VOP is treated as a continued scene change VOP;

the information of the VOP input prior to the i-th VOP contains the information of the (i–1)-th VOP, the (i–2)-th VOP input a period of N VOPs before the (i–1)-th VOP, and the (i–3)-th VOP input a period of N VOPs before the (i–2)-th VOP; and the scene change detector generates the i-th scene change signal so that a code amount after the encoding processing of the i-th VOP by the encoder when the i-th VOP is a continued scene change VOP becomes smaller than a code amount after the encoding processing of the i-th VOP by the encoder when the i-th VOP is a single isolated scene change VOP.

9. The image encoding apparatus according to claim 8, wherein:

if an amount of change in information between an (i–1)-th VOP and an i-th VOP is not greater than a predetermined value, an i-th VOP is not treated as a scene change VOP;

if an amount of change in information between an (i–1)-th VOP and an i-th VOP is greater than a predetermined value, an i-th VOP is treated as a scene change VOP;

if the i-th VOP is a scene change VOP, if the encoding processing of the (i–1)-th VOP is skipped and if the (i–1)-th VOP is not a continued scene change VOP, the scene change detector generates an i-th scene change signal indicating that an i-th VOP is a single isolated scene change VOP; and if the i-th VOP is a scene change VOP, if the encoding processing of the (i–1)-th VOP is skipped and if the (i–1)-th VOP is a continued scene change VOP, the scene change detector generates an i-th scene change signal indicating that the i-th VOP is a continued scene change VOP.

10. An image encoding method comprising the steps of:

detecting an amount of change in information between an i-th Video Object Plane (VOP), where i is an integer not smaller than 1, and an (i–1)-th VOP input a period of N Video Object Planes (VOPs) before the i-th VOP, where N is an integer not smaller than 1;

generating an i-th scene change signal of an i-th VOP on the basis of the information of the i-th VOP and a VOP input prior to the i-th VOP and the (i–1)-th skip signal indicating whether or not the encoding processing of the (i–1)-th VOP is skipped;

generating an i-th skip signal indicating whether or not the encoding processing of the i-th VOP is skipped; and determining a code amount after the encoding processing of the i-th VOP by using the i-th scene change signal and performing the encoding processing of the i-th VOP.

11. The image encoding method according to claim 10, further comprising the step of:

detecting a code amount after the encoding processing of an (i−1)-th VOP on the basis of a code amount after the encoding processing of the (i−1)-th VOP, the i-th skip signal, and the i-th scene change signal.

12. The image encoding method according to claim 10, wherein:

if an amount of change in information between an (i−1)-th VOP and an i-th VOP is greater than a predetermined value, an i-th VOP is treated as a scene change VOP; and     if the i-th VOP is not the scene change VOP and if the encoding processing of the (i−1)-th VOP is skipped, the i-th scene change signal of the i-th VOP is equalized with the (i−1)-th scene change signal corresponding to the (i−1)-th VOP.

13. The image encoding method according to claim 10, wherein:

if an amount of change in information between the (i−1)-th VOP and the i-th VOP is greater than a predetermined value and if an amount of change in information between an (i−2)-th VOP and the (i−1)-th VOP is not greater than a predetermined value, the i-th VOP is treated as a single isolated scene change VOP;

if an amount of change in information between the (i−1)-th VOP and the i-th VOP is greater than a predetermined value and if an amount of change in information between an (i−2)-th VOP and the (i−1)-th VOP is greater than a predetermined value, the i-th VOP is treated as a continued scene change VOP; and     the information of the VOP input prior to the i-th VOP contains the information of the (i−1)-th VOP, the (i−2)-th VOP input a period of N VOPs before the (i−1)-th VOP, and the (i−3)-th VOP input a period of N VOPs before the (i−2)-th VOP;

the method further comprising the step of:

generating the i-th scene change signal so that a code amount after the encoding processing of the i-th VOP by the encoder when the i-th VOP is a continued scene change VOP becomes smaller than a code amount after the encoding processing of the i-th VOP by the encoder when the i-th VOP is a single isolated scene change VOP.

14. The image encoding method according to claim 13, wherein:

if an amount of change in information between an (i−1)-th VOP and an i-th VOP is not greater than a predetermined value, an i-th VOP is not treated as a scene change VOP;

if an amount of change in information between an (i−1)-th VOP and an i-th VOP is greater than a predetermined value, an i-th VOP is treated as a scene change VOP;

if the i-th VOP is a scene change VOP, if the encoding processing of the (i−1)-th VOP is skipped and if the (i−1)-th VOP is not a continued scene change VOP, an i-th scene change signal indicating that an i-th VOP is a single isolated scene change VOP is generated; and     if the i-th VOP is a scene change VOP, if the encoding processing of the (i−1)-th VOP is skipped and if the (i−1)-th VOP is a continued scene change VOP, an i-th scene change signal indicating that the i-th VOP is a continued scene change VOP is generated.

15. The image encoding method according to claim 10, wherein:

if an amount of change in information between an (i−1)-th VOP and an i-th VOP is not greater than a predetermined value, an i-th VOP is not treated as a scene change VOP;

if an amount of change in information between an (i−1)-th VOP and an i-th VOP is greater than a predetermined value, an i-th VOP is treated as a scene change VOP;

if the i-th VOP is a scene change VOP, if the encoding processing of the (i−1)-th VOP is not skipped and if the (i−1)-th VOP is not a scene change VOP, an i-th scene change signal indicating that the i-th VOP is a single isolated scene change VOP is generated; and     if the i-th VOP is a scene change VOP, if the encoding processing of the (i−1)-th VOP is not skipped and if the (i−1)-th VOP is a scene change VOP, an i-th scene change signal indicating that the i-th VOP is a continued scene change VOP is generated.

\* \* \* \* \*